(12) United States Patent
Rajadurai et al.

(10) Patent No.: US 11,303,676 B2
(45) Date of Patent: Apr. 12, 2022

(54) METHOD AND SYSTEM FOR AUTHENTICATING APPLICATION PROGRAM INTERFACE (API) INVOKERS

(71) Applicant: Samsung Electronics Co., Ltd., Suwon-si (KR)

(72) Inventors: Rajavelsamy Rajadurai, Bangalore (IN); Narendranath Durga Tangudu, Bangalore (IN); Nishant Gupta, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 86 days.

(21) Appl. No.: 16/192,069

(22) Filed: Nov. 15, 2018

(65) Prior Publication Data
US 2019/0149576 A1 May 16, 2019

(30) Foreign Application Priority Data

Nov. 16, 2017 (IN) .............................. 201741041088
Nov. 5, 2018 (IN) .............................. 201741041088

(51) Int. Cl.
*G06F 21/00* (2013.01)
*H04L 29/06* (2006.01)
*G06F 9/54* (2006.01)

(52) U.S. Cl.
CPC .............. *H04L 63/166* (2013.01); *G06F 9/54* (2013.01); *H04L 63/0823* (2013.01); *H04L 63/0869* (2013.01)

(58) Field of Classification Search
CPC .............. H04L 63/166; H04L 63/0823; H04L 63/0869; G06F 9/54
See application file for complete search history.

(56) References Cited

U.S. PATENT DOCUMENTS

| | | | | |
|---|---|---|---|---|
| 7,996,869 | B2* | 8/2011 | Tu | H04N 7/1675 725/80 |
| 2011/0026080 | A1 | 2/2011 | Onishi | |
| 2014/0351446 | A1* | 11/2014 | Cho | H04L 65/80 709/227 |
| 2016/0088109 | A1* | 3/2016 | Chen | H04L 67/42 709/203 |

(Continued)

OTHER PUBLICATIONS

3GPP; 3rd Generation Partnership Project; Technical Specification Group Services and System Aspects; Functional architecture and information flows to support Common API Framework for 3GPP Northbound APIs; Stage 2 (Release 15); 3GPP TS 23.222; V0.1.0; Oct. 2017; Valbonne, France.

(Continued)

*Primary Examiner* — Jeffrey C Pwu
*Assistant Examiner* — Rodman Alexander Mahmoudi
(74) *Attorney, Agent, or Firm* — Jefferson IP Law, LLP

(57) ABSTRACT

A method and system for authenticating application program interface (API) invokers using a common application program interface framework (CAPIF) is provided. The method includes establishing by a CAPIF core function (CCF) a secure Transport Layers Security (TLS) connection with at least one API invoker, on receiving a connection request from the at least one API invoker to access at least one service API on a CAPIF-2e interface. Further, the method includes determining by the CCF at least one security method to be used by the at least one API invoker for a CAPIF-2e interface security (C2eIS) of the at least one API invoker for accessing the at least one service API on a CAPIF-2e interface. The method further includes enabling the C2eIS by an API exposing function (AEF) the at least one API invoker based on the determined at least one security method.

8 Claims, 9 Drawing Sheets

(56) References Cited

U.S. PATENT DOCUMENTS

| | | | |
|---|---|---|---|
| 2017/0026187 A1 | 1/2017 | Ramatchandirane | |
| 2017/0249480 A1* | 8/2017 | Hu | G06F 21/6254 |
| 2017/0264612 A1* | 9/2017 | Kaushal | H04L 63/168 |
| 2020/0007335 A1* | 1/2020 | Tan | H04L 9/32 |

OTHER PUBLICATIONS

Huawei et al.; CAPIF architectural requirements related to security; 3GPP TSG-SA WG6 Meeting #19; S6-171221; Oct. 9-13, 2017; Dubrovnik, Croatia.
Samsung; Pseudo-CR on TS 23.222 CAPIF authentication with CCF; 3GPP TSG-SA WG6 Meeting #19; S6-171453; Oct. 9-13, 2017; Dubrovnik, Croatia.
International Search Report and Written Opinion dated Feb. 12, 2019; International Appln. No PCT/KR2018/014062.
3GPP; 3rd Generation Partnership Project; Technical Specification Group Services and System Aspects; Study on the security aspects of the next generation system (Release 14); 3GPP Draft; S3-172095; XP051336126; 3GPP TR 33.899; V1.3.0; Aug. 21, 2017; Valbonne, France.
LTE; 5G; Security Aspects of Common API Framework for 3GPP Northbound APIs (3GPP TS 33.122 version 15.0.0 Release 15); ETSI TS 133 122; V15.0.0; XP014330208; Sep. 17, 2018; France.
Samsung; Security procedure for CAPIF-1e reference point; 3GPP TSG SA WG3 (Security) Meeting #90; S3-180309; XP051390760; Jan. 22-26, 2018; Gothenburg, Sweden.
European Search Report dated Oct. 12, 2020; European Appln. No. 18878658.6-1218 / 3695575 PCT/KR2018014062.

* cited by examiner

US 11,303,676 B2

METHOD AND SYSTEM FOR AUTHENTICATING APPLICATION PROGRAM INTERFACE (API) INVOKERS

CROSS-REFERENCE TO RELATED APPLICATION(S)

This application is based on and claims priority under 35 U.S.C § 119(a) to Indian Provisional Application No. 201741041088, filed on Nov. 16, 2017, and Indian Complete Patent Application No. 201741041088 filed on Nov. 5, 2018, in the Indian Intellectual Property Office, the disclosures of which are incorporated by reference herein its entirety.

BACKGROUND

1. Field

The present disclosure relates to the field of cellular communications and more particularly related to authenticating application program interface (API) invokers using a common application program interface framework (CAPIF).

2. Description of Related Art

In order to meet wireless data traffic demands that have increased after $4^{th}$ Generation (4G) communication system commercialization, efforts to develop an improved $5^{th}$ Generation (5G) communication system or a pre-5G communication system have been made. For this reason, the 5G communication system or the pre-5G communication system is called a beyond 4G network communication system or a post-LTE system.

In order to achieve a high data transmission rate, implementation of the 5G communication system in a mmWave band (for example, 60 GHz band) is being considered. In the 5G communication system, technologies such as beamforming, massive MIMO, Full Dimensional MIMO (FD-MIMO), an array antenna, analog beamforming, and a large scale antenna are discussed to mitigate a propagation path loss in the mmWave band and increase a propagation transmission distance.

Further, technologies such as an evolved small cell, an advanced small cell, a cloud Radio Access Network (cloud RAN), an ultra-dense network, Device to Device communication (D2D), a wireless backhaul, a moving network, cooperative communication, Coordinated Multi-Points (CoMP), and interference cancellation have been developed to improve the system network in the 5G communication system.

In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Currently, the security aspects and respective security information flows of a common application program interface (API) framework (CAPIF) interfaces (CAPIF-1, CAPIF-1e, CAPIF-2 and CAPIF-2e) are open. Therefore, there is a need for various security methods to support more than one authentication method and a secure interface establishment method/procedure, as the CAPIF will support vast services with different architectural and performance requirements. In view of the foregoing problems, there is a need of system and method for authentication of API Invokers.

SUMMARY

Various embodiments provide a system and a method for authenticating API invokers using a common application program interface framework (CAPIF).

Further, various embodiments provide a system and a method for establishing by a CAPIF core function (CCF) a secure connection with at least one API invoker over a CAPIF-1e interface, on receiving a connection request from the at least one API invoker to access at least one service API on a CAPIF-2e interface.

Further, various embodiments provide a system and a method for determining by the CCF at least one security method to be used by the at least one API invoker for a CAPIF-2e interface security (C2eIS) of the at least one API invoker for accessing the at least one service API on a CAPIF-2e interface.

Further, various embodiments provide a system a method to enable the C2eIS for the at least one API invoker based on the determined at least one security method.

Accordingly the embodiments herein provide a method and system for authenticating application program interface (API) invokers using a common application program interface framework (CAPIF). The method includes establishing by a CAPIF core function (CCF) a secure connection with at least one API invoker, on receiving a connection request from the at least one API invoker to access at least one service API on a CAPIF-2e interface, wherein establishing the secure connection between the CCF and the at least one API invoker based on a mutual authentication between the CCF and the at least one API invoker over a CAPIF-1e interface. Further, the method includes determining by the CCF at least one security method to be used by the at least one API invoker for a CAPIF-2e interface security (C2eIS) of the at least one API invoker for accessing the at least one service API on a CAPIF-2e interface, wherein the at least one security method includes at least one of a Transport Layers Security-Pre-Shared Key (TLS-PSK), a TLS-Public Key Infrastructure (TLS-PKI), an Internet Key Exchange version 2 (IKEv2), an Internet Protocol Security (IPsec) and an OAuth 2.0. The method further includes enabling the C2eIS by an API exposing function (AEF) for the at least one API invoker based on the determined at least one security method. The C2eIS includes at least one of an authentication, an interface protection and an authorization.

In an embodiment, the at least one security method is determined by the CCF and indicated to the API Invoker based on at least one of a type of service the API invoker is subscribed, an Interface type between the AEF and the API Invoker, length of the secure TLS sessions required, access scenarios, capability of the API Invoker, capability of the AEF, preferences of the API Invoker and a negotiation between the at least one API invoker and the CCF. In an embodiment, at least one determined security method is also indicated, either solicited or unsolicited, by the CCF to the AEF to perform the determined security method on the CAPIF-2e interface.

In an embodiment, enabling the C2eIS by the AEF, for the at least one API invoker based on the determined at least one security method includes establishing a secure Transport layer security (TLS) connection with the at least one API invoker over the CAPIF-2e interface using a pre-shared key (PSK) received from the CCF, if the determined at least one security method is the TLS-PSK, wherein the PSK is derived by at least one of the at least one API invoker and the CCF after establishing the secure TLS connection between the CCF and the at least one API invoker over the CAPIF-1e interface. Further, receiving authorization rights of the at least one API invoker from the CCF over the CAPIF-3 interface. Further, authorizing the at least one API invoker to access the at least one service API based on the received authorization rights of the at least one API invoker from the CCF.

In an embodiment, enabling the C2eIS by the AEF, the at least one API invoker based on the determined at least one security method includes establishing a secure TLS connection with the at least one API invoker over the CAPIF-2e interface using a client and a server certificate based mutual authentication, if the determined at least one security method is the TLS-PKI. Further, receiving authorization rights of the at least one API invoker from the CCF over the CAPIF-3 interface. Further, authorizing the at least one API invoker to access the at least one service API based on the received authorization rights of the at least one API invoker from the CCF.

In an embodiment, enabling the C2eIS by the AEF, the at least one API invoker based on the determined at least one security method comprises establishing a secure TLS connection with the at least one API invoker over the CAPIF-2e interface using a certificate-based mutual authentication, if the determined at least one security method is the OAuth (Open Authorization: token based authentication and authorization). Further, receiving a service API access request from the at least one API invoker along with an access token, wherein the access token is generated by the CCF on receiving a OAuth based access token request from the at least one API invoker after establishing the secure TLS connection between the CCF and the at least one API invoker over the CAPIF-1e interface. Further, authorizing the at least one API invoker to access the at least one service API based on the received access token from the at least one API invoker.

In an embodiment, enabling the C2eIS by the AEF, the at least one API invoker based on the determined at least one security method includes establishing a secure TLS connection with the at least one API invoker over the CAPIF-2e interface using a server certificate-based authentication, if the determined at least one security method is the OAuth 2.0. Further, receiving a service API access request from the at least one API invoker along with an access token, wherein the access token is generated by the CCF on receiving a OAuth 2.0 based access token request from the at least one API invoker after establishing the secure TLS connection between the CCF and the at least one API invoker over the CAPIF-1e interface. Further, authorizing the at least one API invoker to access the at least one service API based on the received access token from the at least one API invoker.

Accordingly the embodiments herein provide a system for authenticating application program interface (API) invokers using a common application program interface framework (CAPIF). The system includes a CAPIF core function (CCF) configured to establish a secure connection with at least one API invoker, on receiving a connection request from the at least one API invoker to access at least one service API on a CAPIF-2e interface, wherein establishing the secure connection between the CCF and the at least one API invoker is based on a mutual authentication between the CCF and the at least one API invoker over a CAPIF-1e interface. Further, the CCF configured to determine at least one security method to be used by the at least one API invoker for a C2eIS of the at least one API invoker for accessing the at least one service API on a CAPIF-2e interface, wherein the at least one security method includes at least one of a Transport Layers Security-Pre-Shared Key (TLS-PSK), a TLS-Public Key Infrastructure (TLS-PKI), an Internet Key Exchange version 2 (IKEv2), an Internet Protocol Security (IPsec), an application layer protection, a native authorization mechanism and an OAuth 2.0. Further, the system includes an API exposing function (AEF) configured to enable the C2eIS for the at least one API invoker based on the determined at least one security method. In an embodiment, the at least one security method is determined based on at least one of a type of service the API invoker is subscribed, Interface details between the AEF and the API Invoker, access scenarios, length of a secure Transport layer security (TLS) sessions required, capability of the API Invoker, capability of the AEF, preferences of the API Invoker and a negotiation between the at least one API invoker and the CCF.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

Effects of the present disclosure are not limited to the effects described above. In addition, potential effects expected by a technical feature of the present disclosure may be clearly understood from the following descriptions.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

Embodiments herein are illustrated in the accompanying drawings, throughout which like reference letters indicate corresponding parts in the various figures. The embodiments herein will be better understood from the following description with reference to the drawings, in which.

DETAILED DESCRIPTION OF THE PRESENT DISCLOSURE

Figure 1:
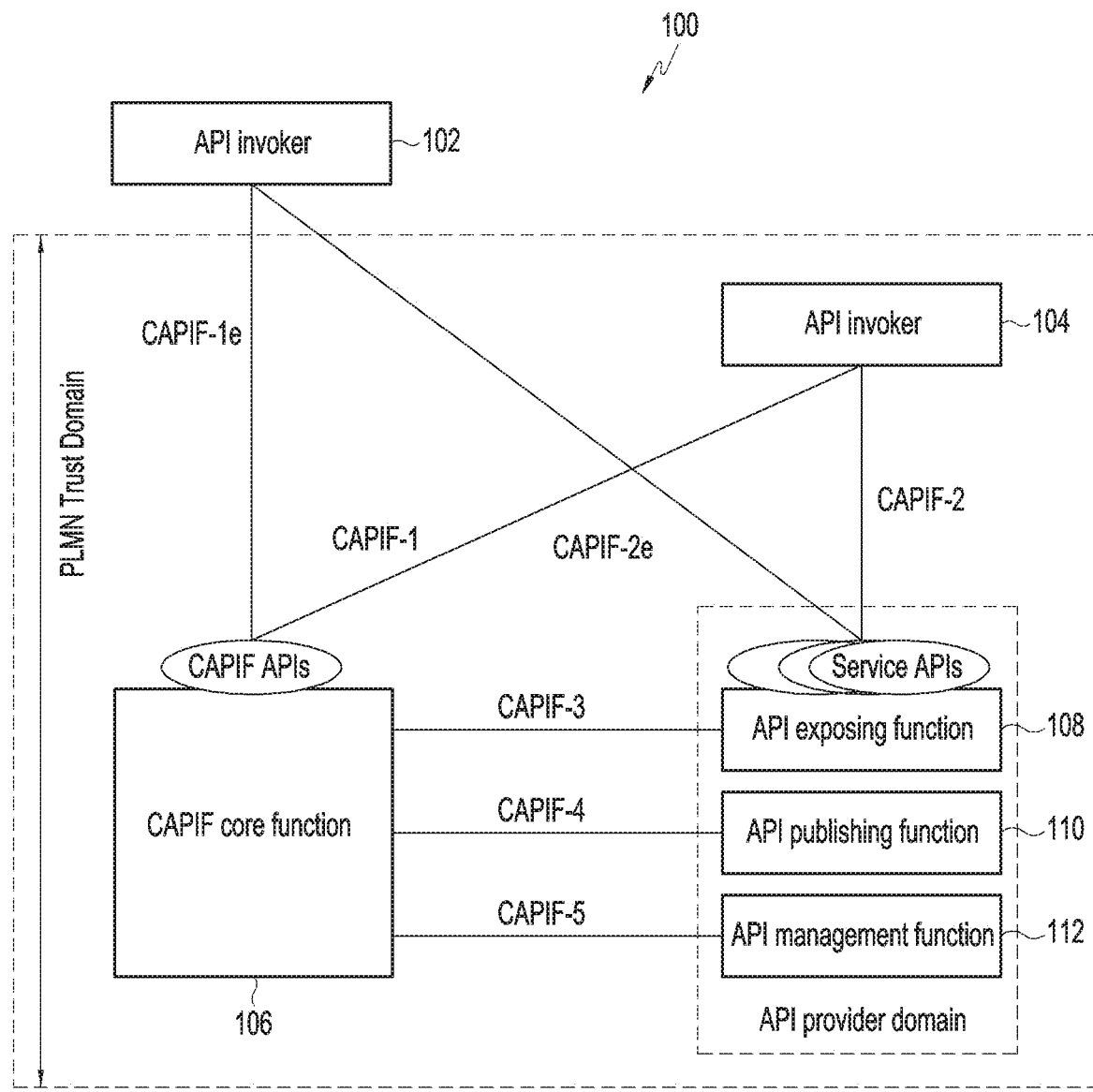
FIG. 1 illustrates a system diagram illustrating common application program interface framework (CAPIF) functional security mechanisms for authenticating and authorizing an API invoker, according to an embodiment as disclosed herein.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein. Those skilled in the art will understand that the principles of the present disclosure may be implemented in any suitably arranged system or device.

Hereinafter, various embodiments will be described with reference to the accompanying drawings. However, it should be understood that there is no intent to limit the present disclosure to the particular forms disclosed herein; rather, the present disclosure should be construed to cover various modifications, equivalents, and/or alternatives of embodiments. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" may include (1) at least one A, (2) at least one B, or (3) both at least one A and at least one B.

The expression "a first", "a second", "the first", or "the second" used in various embodiments may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there is no element (e.g., third element) interposed between them.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used in the present disclosure are only used to describe specific embodiments, and are not intended to limit the present disclosure. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments.

The embodiments herein achieve a method and system for authenticating application program interface (API) invokers using a common application program interface framework (CAPIF). The method includes establishing by a CAPIF core function (CCF) a secure connection with at least one API invoker, on receiving a connection request from the at least one API invoker to access the at least one service API on a CAPIF-2e interface, wherein establishing the secure connection between the CCF and the at least one API invoker is based on a mutual authentication between the CCF and the at least one API invoker over a CAPIF-1e interface. Further, the method includes determining and indicating by the CCF at least one security method to be used by the at least one API invoker for the C2eIS (i.e., authentication, interface protection and authorization) of the at least one API invoker for accessing the at least one service API on a CAPIF-2e interface, wherein the at least one security method includes at least one of a Transport Layers Security-Pre-Shared Key (TLS-PSK), a TLS-Public Key Infrastructure (TLS-PKI), IKEv2, IPsec and an OAuth. The method further includes enabling the C2eIS by an API exposing function (AEF) the at least one API invoker based on the determined at least one security method. Referring now to the drawings, and more particularly to FIGS. 1 through 9, where similar reference characters denote corresponding features consistently throughout the figures, there are shown example embodiments.

FIG. 1 illustrates a system 100 diagram illustrating CAPIF functional security mechanisms for authenticating, securing the interface and authorizing the API invoker 102, according to an embodiment as disclosed herein.

The system 100 includes one or more API invokers 102, 104, a CAPIF core function (CCF) 106, an application program interface exposing function (AEF) 108, API publishing function 110 and API management function 112. In an embodiment, the one or more API invokers 102, 104 can be at least one of, but not limited to a computer, laptop, mobile phone, personal digital assistants (PAD) and servers or any other device which tries to access the AEF 108 for one or more service API's. In embodiment, the one or more API invokers can be configured to invoke one or more service API's present on a network. The CCF 106 is a functional entity which can be configured to accumulate all common aspects of service API's. The CCF 106 can be configured for authenticating, monitoring, logging authorization, discovery which is common to all the service API's. The AEF 108 is the entity which can be configured for exposing the one or more service API's to the API invokers (i.e., for 102 and 104). The API invoker 102 can have a direct connection with the AEF 108 to invoke the service API's. However, the API invoker 102 may not have the direct connection with the API publishing function 110 and the API management function 112. The API publishing function 110 can be configured to publish library of service API's on the CCF 106. Further, the API management function 112 can be configured to manage functions related managing of loggings and auditing of logs stored in the CCF 106.

In an embodiment, the API invoker 104 which is present in a public land mobile network (PLMN) trust domain is trusted by an operator and the API invoker 102 which is present outside the PLMN trust domain may not be trusted by the operator. The API invoker 104 which is trusted by the operator may not go through any security checks. However, the API invoker 102, which is present outside the PLMN trust domain may go through more level of security checks.

Further, the system 100 includes one or more interfaces/reference points. The one or more interfaces includes a CAPIF-1, CAPIF-1e, CAPIF-2, CAPIF-2e, CAPIF-3, CAPIF-4 and CAPIF-5 interfaces. These interfaces are defined in 3rd Generation Partnership Project (3GPP) TS 23.222 standard and the CAPIF functionality is defined in 3GPP TS 23.222 standard. The CAPIF-1, the CAPIF-2, the CAPIF-3, the CAPIF-4 and the CAPIF-5 interfaces are present within a public land mobile network (PLMN) trust domain while the CAPIF-1e and the CAPIF-2e interfaces are present between the CCF 106 and the AEF 108 access points for the API Invoker 102 present outside of the PLMN trust domain. A security for the CAPIF-1, the CAPIF-2, the CAPIF-3, the CAPIF-4 and the CAPIF-5 interfaces supports Transport Layer security (TLS) as defined in the 3GPP TS 23.222 standard.

Authentication and authorization are required for both the API invokers (i.e., 102, 104) which present within the PLMN trust domain and outside of the PLMN trust domain. To authenticate and authorize the API invoker 102 present outside of the PLMN trust domain, the CCF 106 must in coordination with the AEF 108 and utilizes the CAPIF-1e, the CAPIF-2e and the CAPIF-3 interfaces to onboard to authenticate and authorize the API invoker 102 prior to granting an access to CAPIF services/service API's. When the API invoker 104 is within the PLMN trust domain, the CCF 106 in coordination with the AEF 108 can perform authentication and authorization of the API invoker 104 via the CAPIF-1, the CAPIF-2 and the CAPIF-3 interfaces prior to granting access to the CAPIF services.

The CAPIF-1/1-e between the API Invoker 102 and the CCF 106. Further, the system 100 authenticates the API Invoker 102 based on the identity and credentials of the API Invoker 102 or presenting a valid security token. There is a mutual authentication between the API Invoker and the CCF. Further, the system 100 provides authorization for the API Invoker prior to accessing one or more service API's. For the CAPIF-2/2e between the API Invoker 102 and the AEF 108, the system 100 authenticates the API Invoker 102 based on the identity and credentials of the API invoker 102 or presenting the valid security token (OAuth). Further, the system 100 provides authorization for the API invoker 102 prior to accessing the service API. Further, there is an authorization and verification for the API invoker upon accessing the service API. Further, the system 100 controls the service API access based on a PLMN operator configured policies. The CAPIF-1e and the CAPIF-2e are reference points, where the API invoker 102 is outside the PLMN trust domain.

The embodiments herein provides a method and system 100 for authenticating the API invokers using the CAPIF, the method includes establishing by the CCF 106 a secure connection with at least one API invoker 102, on receiving a connection request from the at least one API invoker 102 to access the at least one service API on the CAPIF-2e interface. The secure connection is established between the CCF 106 and the at least one API invoker 102 is based on a mutual authentication between the CCF 104 and the at least one API invoker 102 over the CAPIF-1e interface. Further, the method includes determining by the CCF 106, at least one security method to be used by the at least one API invoker 102 for the C2eIS (i.e., authentication, interface protection and authorization) of the at least one API invoker 102 for accessing the at least one service API on the CAPIF-2e interface. The at least one security method includes at least one of a Transport Layers Security-Pre-Shared Key (TLS-PSK), a TLS-Public Key Infrastructure (TLS-PKI), an Internet Key Exchange version 2 (IKEv2), an Internet Protocol Security (IPsec), an application layer protection, a native authorization mechanism and an OAuth. Further, the method includes enabling the C2eIS by the AEF 108, for the at least one API invoker 102 based on the determined at least one security method. In an embodiment, the at least one security method is determined based on at least one of a type of service the API invoker 102 is subscribed, a type Interface between the AEF 108 and the API Invoker 102, access scenarios, length of a secure Transport layer security (TLS) sessions required, a capability of the API Invoker 102, capability of the AEF 108, preferences of the API Invoker 102 and a negotiation between the at least one API invoker 102 and the CCF 106. In an embodiment, the at least one determined security method is also indicated, either solicited or unsolicited, by the CCF 106 to the AEF 108 to perform the determined security method on the CAPIF-2e interface.

In an embodiment, enabling the C2eIS by the AEF 108, for the at least one API invoker 102 based on the determined at least one security method includes, establishing a secure TLS connection between the AEF 108 and the at least one API invoker 102 over the CAPIF-2e interface using the PSK received from the CCF 106, if the determined at least one security method is the TLS-PSK, wherein the PSK is derived by at least one of the at least one API invoker 102 and the CCF 106 after establishing the secure TLS connection between the CCF 106 and the at least one API invoker 102 over the CAPIF-1e interface. Further, receiving authorization rights of the at least one API invoker from the CCF over the CAPIF-3 interface. Further, authorizing the at least one API invoker 102 to access the at least one service API based on the received authorization rights of the at least one API invoker 102 from the CCF 106.

In an embodiment's, the API Invoker 102 discovers/identifies to contact the AEF 108 directly for the service API, then the API Invoker 102 initiates an authentication with the AEF 108 directly. Then, a mutual authentication based on a client and server certificates shall be performed between the API invoker 102 and the AEF 108 to establish a secure TLS connection with the help of CCF 106. Here, the API invoker 102 is pre-configured or provisioned by the CCF 106 or during a service discovery and obtains an information that is required for a particular service API. Here, a request needs to be made directly with the AEF 108 without contacting the CCF 106, provided the determined security method for the service and related valid security credentials are available with the API invoker 102. Further, the AEF 108 may not depend on the CCF to authenticate the API invoker (for example, if the root certificate 106 to authenticate the API invoker 102 is pre-provisioned/available with the AEF 108).

After a successful establishment of the secure TLS connection on the CAPIF-2e between the API Invoker 102 and the AEF 108. The AEF 108 requests the API Invoker's 102 authorization rights from the CCF 106 over the CAPIF-3 reference point. Further, the CCF 106 responds with the API Invoker's 102 authorization rights over the CAPIF-3. Further, on establishing the secure TLS connection over the CAPIF-2e interface, the API Invoker 102 invokes applicable 3GPP northbound APIs/service API. Further, the AEF 108 honor's the API invocations based on the authorization rights of the API Invoker 102.

In an embodiment, enabling the C2eIS by the AEF 108, for the at least one API invoker based on the determined at least one security method includes establishing a secure TLS connection with the at least one API invoker 102 over the CAPIF-2e interface using a client and a server certificate based mutual authentication, if the determined at least one security method is the TLS-PKI. Further, receiving authorization rights of the at least one API invoker 102 from the CCF 106 over the CAPIF-3 interface. Further, authorizing the at least one API invoker 102 to access the at least one service API based on the received authorization rights of the at least one API invoker 102 from the CCF 106.

In an embodiment, enabling the C2eIS by the AEF 108, for the at least one API invoker 102 based on the determined at least one security method comprises establishing a secure TLS connection between the AEF 108 and the at least one API invoker 102 over the CAPIF-2e interface using at least one of a certificate-based mutual authentication and a server side certificate-based authentication, if the determined at least one security method is the OAuth. Further, receiving a service API access request from the at least one API invoker 102 along with an access token, wherein the access token is generated by the CCF 106 on receiving a OAuth based access token request from the at least one API invoker 102 after establishing the secure TLS connection between the CCF 106 and the at least one API invoker 102 over the CAPIF-1e interface. Further, authorizing the at least one API invoker 102 to access the at least one service API based on the received access token from the at least one API invoker 102.

In an embodiment, the security aspects and relevant information flows proposed for the CAPIF are applicable for other reference points like, T8 interface defined for Machine Type Communication and Service Based Architecture defined for the fifth generation (5G) systems.

FIG. 1 shows exemplary units of the system 100, but it is to be understood that other embodiments are not limited thereon. In other embodiments, the system 100 may include less or more number of units. Further, the labels or names of the units are used only for illustrative purpose and does not limit the scope of the embodiments herein. One or more units can be combined to perform same or substantially similar function in the system 100.

Figure 2:
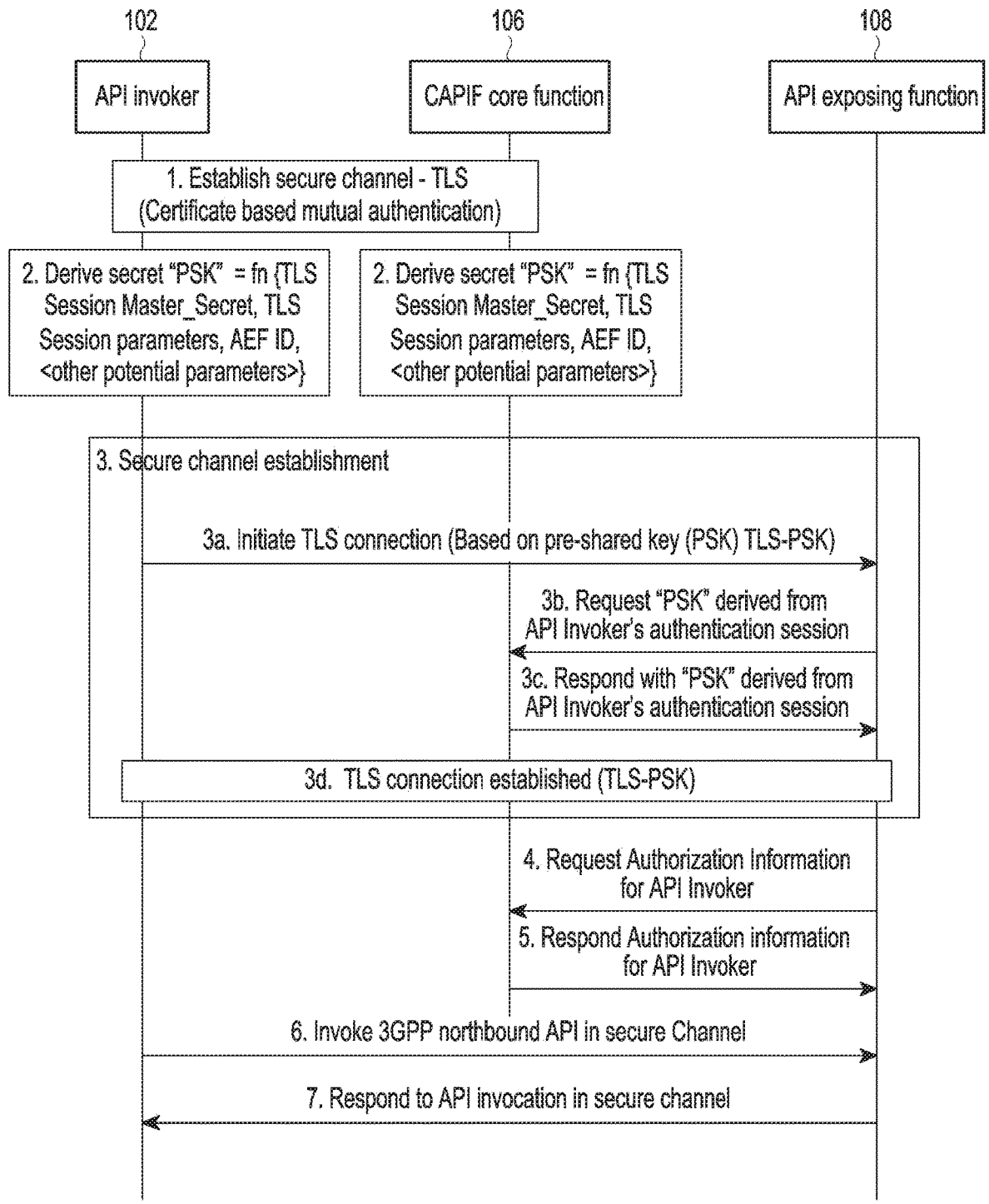
FIG. 2 illustrates a sequence diagram illustrating a secure channel establishment for authentication and authorization of an API invoker over the CAPIF-1e, the CAPIF-2e and the CAPIF-3 reference points using a pre-shared key (PSK), according to an embodiment as disclosed herein.

FIG. 2 illustrates a sequence diagram illustrating a secure channel establishment for authentication and authorization of the API invoker 102 over the CAPIF-1e, the CAPIF-2e and the CAPIF-3 reference points using the PSK, according to an embodiment as disclosed herein.

According to FIG. 2, the embodiments herein establishes the dedicated secure connection/session for authenticating the API invoker 102. The dedicated secure connection between the API Invoker 102 and the AEF 108 can be established using two different methods such as the PSK based and the certificate based method. The established dedicated secure session can be used for all API invocations and responses. To establish the dedicated secure session, a PSK can be derived after the successful mutual authentication between the CCF 106 and the API invoker 102 over the CAPIF-1 e interface. Further, the PSK can be used to establish the secure connection (for example, TLS or IPSec) between the API invoker 102 and AEF 108 over the CAPIF-2e interface. The CAPIF-1e security mechanism can be used to "bootstrap" a key for authenticating the secure TLS connection for the CAPIF-2e. In the absence of the PSK, certificate based mutual authentication between the API invoker 102 and AEF 108 can be used to establish the secure TLS session over the CAPIF-2e interface.

The FIG. 2 shows a high-level security information flows between the API invoker 102, the CCF 106 and the AEF 108 for establishing the secure channel using the PSK (for the access scenario: the API invoker 102 access the AEF 108 prior to the service API invocation). The security information is exchanged over the CAPIF-1e, the CAPIF-2e and the CAPIF-3 reference points are detailed below in the steps.

At step 1, the method includes establishing the secure TLS session/connection between the API invoker 102 and the CCF 106 over the CAPIF-1e interface. The method allows the API invoker 102 and the CCF 106 to establish the secure TLS session/connection between the API invoker 102 and the CCF 106 over the CAPIF-1e interface. The secure TLS session can be established between the API invoker 102 and the CCF 106 based on the mutual authentication between the API invoker 102 and the CCF 106. The mutual authentication can be certificate based mutual authentication (i.e., mutual authentication based on a client (i.e., API invoker 102) and a server (i.e., CCF 106) certificates).

At step 2, the method includes deriving the PSK over the CAPIF-1e interface. The method allows the API invoker 102 and the CCF 106 to derive the PSK. After the successful establishment of the secure TLS session, the PSK can be derived based on the TLS Session's master secret, AEF's 108 specific parameters, session parameters and other possible parameters. In an embodiment, derivation of the PSK at the CCF 106 can be delayed till a request for the PSK is received from the AEF 108. In an embodiment, the PSK is specific to a particular AEF 108 (PSK is bound to an AEF ID). The AEF ID is unique identifier at least within the CAPIF. $AEF_{PSK}$=KDF (TLS Session Master_Secret, TLS Session parameters, AEF ID, <other potential parameters>). The KDF is a Key Derivation Function. $AEF_{PSK}$ and the PSK terms are used interchangeably throughout this document.

At step 3a, the method includes initiating the secure channel establishment (TLS-PSK) request with the AEF 108. The method allows the API invoker 102 to initiate the TLS-PSK request with the AEF 108. On deriving the PSK at the API invoker 102, the API invoker 102 initiates the secure channel establishment request with the AEF 108. In an embodiment, the API invoker 102 may derive the PSK any time before establishing a Secure TLS connection between the API invoker 102 and the AEF 108.

At step 3b, the method includes requesting the PSK from the CCF 106 derived from the API invoker 108 over the CAPIF-3 reference point. The method allows the AEF 108 to requests the CCF 106 for the PSK derived from the API invoker 102 over the CAPIF-3 reference point.

At step 3c, the method includes receiving the PSK from the CCF 106 over CAPIF-3 reference point. The method allows the AEF 108 to receive the PSK from the CCF 106 over CAPIF-3 reference point. The CCF 106 can be configured to respond with the derived PSK over CAPIF-3 reference point on receiving the request from the AEF 108. In an embodiment, the CCF 106 can derive the PSK and send it to the AEF 108 in a notification message without any solicitation from the AEF 108. In such a case, steps 3b and 3c as shown in the FIG. 2 can be omitted to reduce latency.

At step 3d, the method includes establishing the secure TLS connection between the API invoker 102 and the AEF 108 using the PSK. The method allows the AEF 108 to establish the secure TLS connection between the API invoker 102 and the AEF 108 using the PSK. The secure TLS connection between the API invoker 102 and the AEF 108 can be established over the CAPIF-2e interface.

At step 4, the method includes requesting the API invoker's 102 authorization rights from the CCF 106 over the CAPIF-3 reference point. The method allows the AEF 108 to request the API invoker's 102 authorization rights from the CCF 106 over the CAPIF-3 reference point.

At step 5, the method includes receiving the API Invoker's 102 authorization rights from the CCF 106 over the CAPIF-3. The method allows the AEF 108 to receive the API invoker's 102 authorization rights from the CCF 106 over the CAPIF-3 interface.

At step 6, the method includes the API invoker 102 invoking applicable 3GPP northbound APIs/service API's with the AEF over the secured CAPIF-2e interface.

At step 7, the method includes authorizing the at least one API invoker 102 to access the at least one service API based on the received authorization rights of the at least one API invoker 102 from the CCF 106. The method allows the AEF 108 to authorize the at least one API invoker 102 to access the at least one service API based on the received authorization rights of the at least one API invoker 102 from the CCF 108. The AEF 108 honors the API invocations based on authorization rights of API invoker 102.

Figure 3:
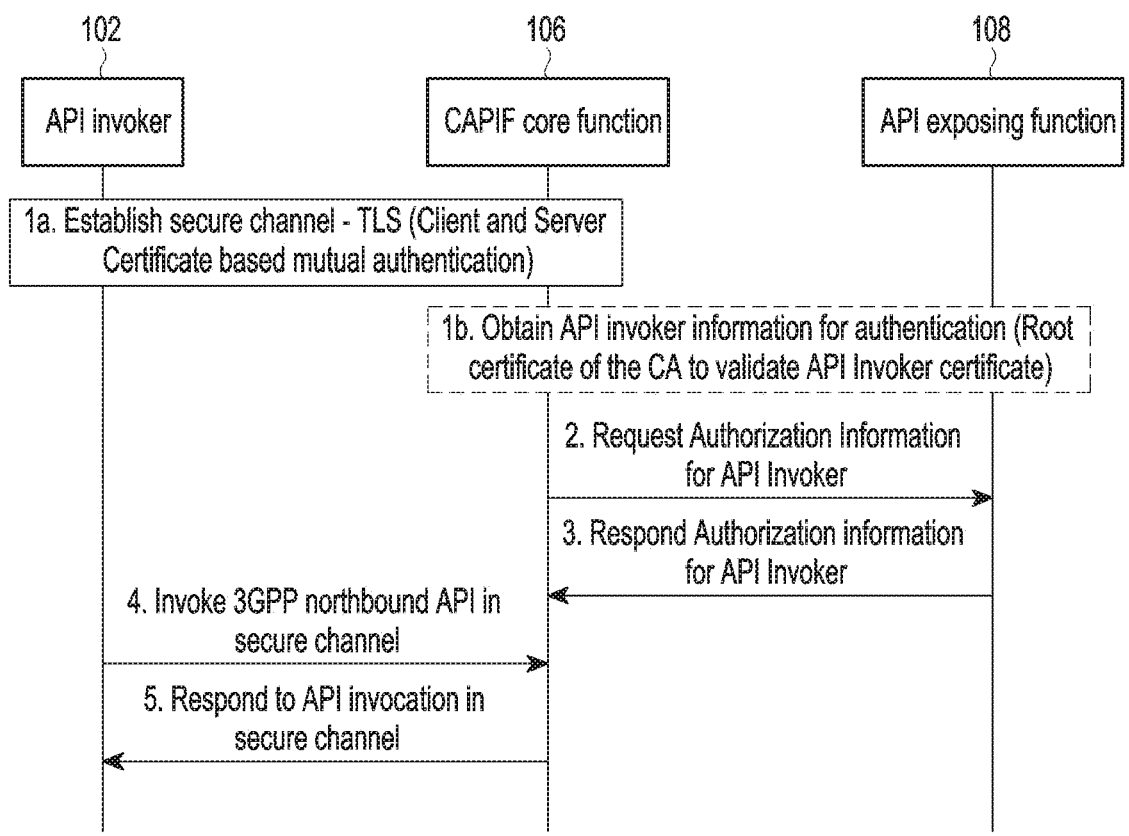
FIG. 3 illustrates a sequence diagram illustrating a secure channel establishment for authentication and authorization of the API invoker over CAPIF-2e and CAPIF-3 reference points using certificate based mutual authentication, according to an embodiment as disclosed herein.

FIG. 3 illustrates a sequence diagram illustrating the secure channel establishment for authentication and authorization of the API invoker 102 over the CAPIF-2e and the CAPIF-3 reference points using certificate based mutual authentication, according to an embodiment as disclosed herein.

The embodiment's herein allows exchange of the security information over the CAPIF-2e and the CAPIF-3 reference points.

At step 1a, the API invoker 102 discovers/identifies to contact the AEF 108 directly for the service API, then the API invoker 102 initiates an authentication with the AEF 108 directly. Further, a mutual authentication based on a client and server certificates shall be performed between the API invoker 102 and the AEF 108 to establish the secure TLS connection with the help of CCF 106 (step 1b). In this scenario, the API invoker is pre-configured or provisioned by the CCF 106 or during a service discovery and obtains an information that is required for a particular service API. Here, the API invoker 102 can directly requests a connection with the AEF without (or after) contacting the CCF 106. After a successful establishment of the secure TLS connection on the CAPIF-2e (i.e., between the API Invoker 102 and the AEF 108), the AEF 108 requests the API Invoker's 102 authorization rights from the CCF 106 over the CAPIF-3 reference point. Further, the CCF 106 responds with the API Invoker's 102 authorization rights over the CAPIF-3 reference point. Further, on establishing the secure TLS connection over the CAPIF-2e interface, the API Invoker 102 invokes applicable 3GPP northbound APIs/service API. Further, the AEF 108 honor's the API invocations based on the authorization rights of the API Invoker.

Figure 4:
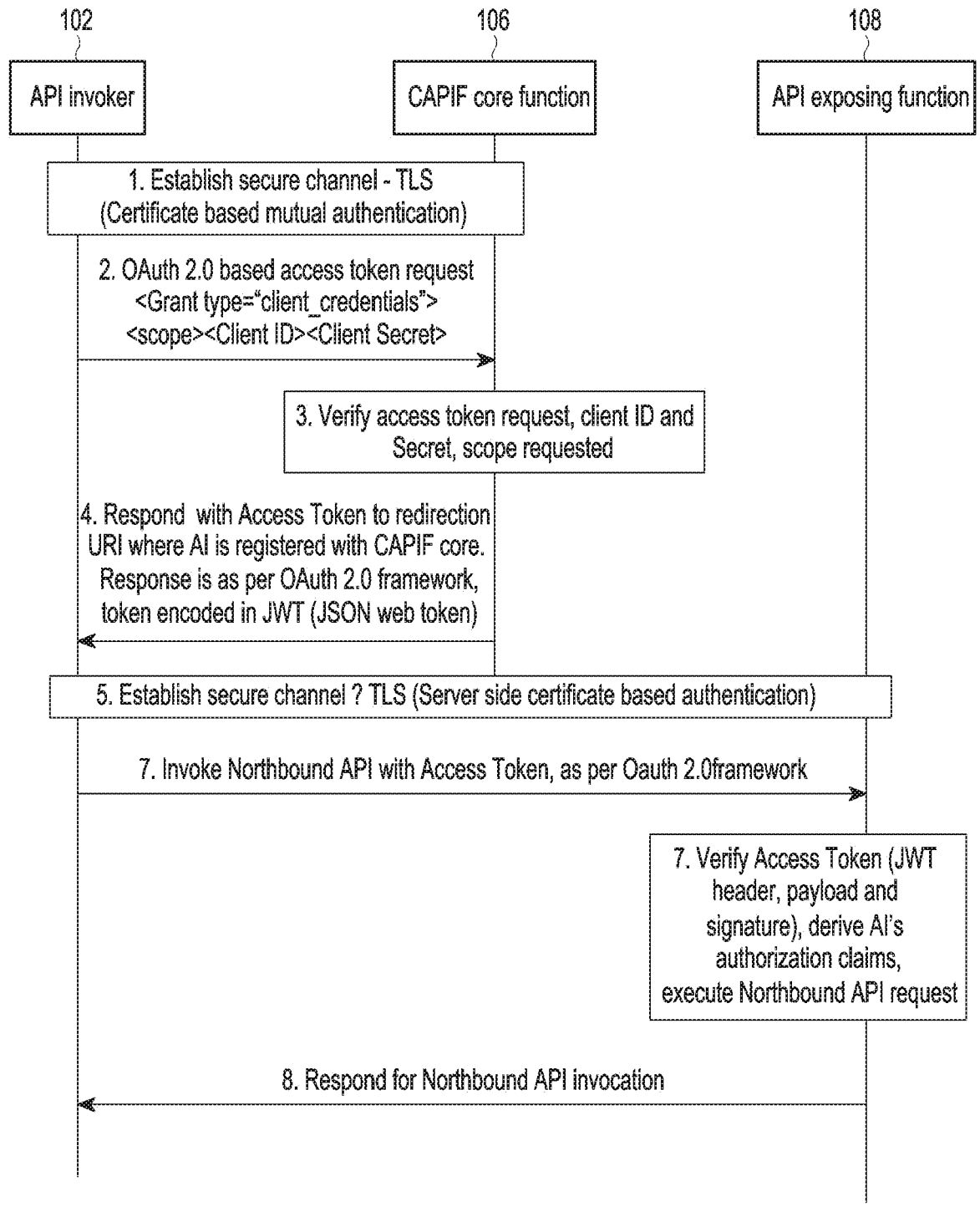
FIG. 4 illustrates a sequence diagram illustrating a secure channel establishment for authentication and authorization of the API invoker over the CAPIF-1e and the CAPIF-2e reference points using OAuth based Access Tokens, according to an embodiment as disclosed herein.

FIG. 4 illustrates a sequence diagram illustrating the secure channel establishment for authentication and authorization of the API invoker 102 over the CAPIF-1e and the CAPIF-2e reference points using OAuth based Access Tokens, according to an embodiment as disclosed herein. The embodiments herein establishes the secure channel over the CAPIF-1e interface. The CAPIF-2e reference points uses the access tokens to authorize and honor the API Invoker's 102 service API invocations to the AEF 108.

The FIG. 4 shows the high-level security information flows between the API Invoker 102, the CCF 106 and the AEF 108. The security information can be exchanged over the CAPIF-1e, the CAPIF-2e and the CAPIF-3 reference points. The method is based on an OAuth 2.0 authorization framework. With reference to the OAuth 2.0, the CCF 106 maps to authorization and token protocol endpoints. Further, the API Invoker 102 maps to a resource owner, client and redirection endpoints and the AEF 108 maps to a resource server. Illustration of the authentication and authorization of the API invoker 102 over the CAPIF-1e and the CAPIF-2e reference points using Access Tokens is based on an assumption that a client endpoint type is registered as confidential, authorization grant type is a client credentials, the access token is a bearer type (RFC 6750) and based on JWT (JSON web token).

At step 1, the method includes establishing by the, API Invoker 102 and the CCF 108, a secure TLS session based on the certificate based mutual authentication over the CAPIF-1e interface. The method allows the API Invoker 102 and the CCF 106 to establish the secure TLS session based on the certificate based mutual authentication.

At step 2, the method includes requesting the access token from the CCF 106 using an https request. The method allows the API invoker 102 to request the access token from the CCF 106 using the https request. After successful establishment of the secure TLS session over the CAPIF-1e, the API Invoker 102 requests the access token from the CCF 106 using the https request. The https request contains grant type "client credentials", scope (set of permissions requested), the API Invoker client identifier and secret generated and shared during registration with the CCF 106.

At step 3, the method includes verifying a grant request from the API Invoker 102, for a valid credentials, a request type and a scope requested. The method allows the CCF 106 to verify the grant request from the API Invoker 102, for the valid credentials, the request type and the scope requested.

At step 4, the method includes generating the access token. The method allows the CCF 106 to generate the access token. Post successful grant request verification by the CCF 106, the access token can be generated. The generated access token can be encoded as a JSON Web Token as defined in IETF RFC 7519. The access token may include the JSON web digital signature profile as defined in IETF RFC 7515. Further, the access token is shared over the redirect uniform resource identifier (URI), wherein the URI is given by the API Invoker 102 during registration with the CCF 106.

At step 5, the method includes establishing the secure TLS connection with the AEF 108 using one-way authentication of the AEF 108 endpoint based on a server certificate over the CAPIF-2e interface. The method allows the API invoker 102 to establish the secure TLS connection with the AEF 108 using one-way authentication of the AEF 108 endpoint based on the server certificate over the CAPIF-2e interface.

At step 6, the method includes sending an access request/invocation for the 3GPP northbound API/service API along with the access token to the AEF 108 over the CAPIF-2e interface (for the access scenario: the API invoker 102 access the AEF 108 upon the service API invocation). The method allows the API invoker 102 to send the access request/invocation for the 3GPP northbound API/service API along with the access token to the AEF 108 over the CAPIF-2e interface. The Access token received from the CCF 106 can be sent along with API invocation request. The token is placed as "Bearer" property value under "Authorization" header of https request (API invocation).

At step 7, the method includes validating the access token based on a signature which is part of the access token. The method allows the AEF 108 to validate the access token based on the signature which is part of the access token. A valid signature, verifies the API Invoker's request against the authorization permissions in the access token.

At step 7, on successful verification of the access token and authorization rights of the API Invoker 102, the requested service API is invoked and an appropriate result is sent as response to API Invoker 102.

In an embodiment, various factors and requirements which can influence applicability of appropriate security method (i.e., PSK and OAuth.2.0). However, a business requirements need can be a common factor for selecting the security method, but implementations can use the following criteria in deciding the security method.

Selection Criteria for Method 1 (i.e., PSK Based):

This method allows for establishment of a dedicated secure session. As the dedicated secure TLS session is established (with authorization during start of session), this can be used for multiple API invocations avoiding authorization verification for every invocation request. This method can be selected based on the following criteria/scenario:

If the secure TLS channel sessions need to be active for long durations (like 12 hrs or more), the API Invoker 102 uses these sessions for the API invocations over a period of time, without establishing the secure TLS connection for every request.

If there is need for quick burst of the API invocations in short duration (Like 500 invocations in 5 minutes), the API Invoker 102 can use this method to setup dedicated secure TLS session with the AEF 108 and avoid authorization verification for every invocation request.

If the API Invoker 102 or CAPIF-2e reference point or the AEF 108 has stringent requirements like size of the message exchange to be minimized, minimized power consumption or the like. Then the API Invoker 102 may select this method.

Selection Criteria for Method 2 (i.e., OAuth):

This method is based on the OAuth 2.0 and provides a framework for secure asynchronous API invocation request and response. This method can be selected based on following criteria/scenario:

If the API invocations are sparse and need for secure session is short lived, then the OAuth 2.0 can be selected.

If the resources available on the AEF 108 are not adequate to maintain the secure TLS session after authentication, for example, due to network load or authentication and authorization functions are offloaded as a separate network entity. Then the OAuth 2.0 can be selected.

The security methods (either the PSK based or the OAuth or the PKI based or the like) can be determined and selected based on an access scenario, characteristics and constraints on a requested service, interface details (such as IP address/port), status of the reference point, capabilities of the entities, or the like.

Figure 5:
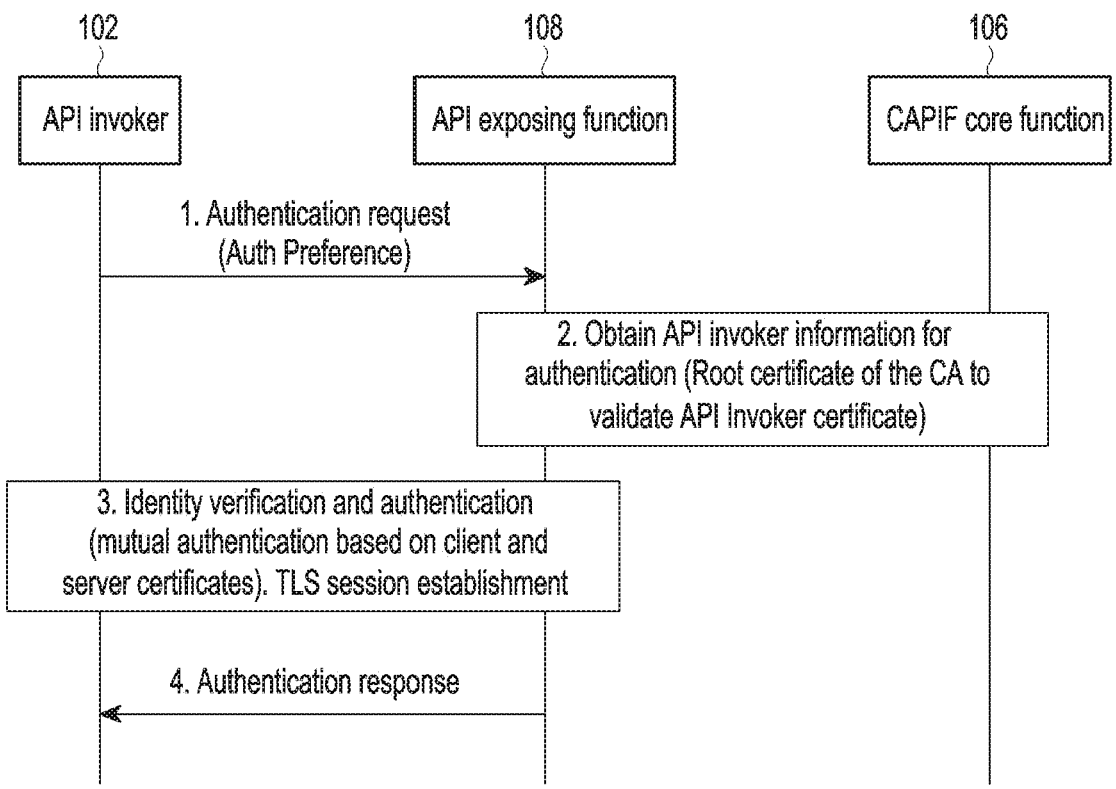
FIG. 5 illustrates a sequence diagram illustrating a procedure flow for authentication between an API Invoker and an API exposing function (AEF) prior to service API invocation, according to an embodiment as disclosed herein.

FIG. 5 illustrates a sequence diagram illustrating a procedure flow for authentication between the API Invoker 102 and the AEF 108 prior to service API invocation, according to an embodiment as disclosed herein.

The embodiments herein allows the API invoker 102 to directly contact the AEF 108 and authenticates with the AEF 108 (no prerequisite are required to perform with the CCF 106). If a service discovery is already performed, then the API Invoker 102 requests the CCF 106 to provide a Root certificate(s) of a root certificate authority (CA) to verify the AEF Certificate (s) of the AEF 108 that the API Invoker 102 discovered for subsequent API invocations. The CA may be hosted by an operator or is trusted by the operator. Alternatively, the CCF 106 provides the list of Root certificate(s) of the CA to verify the AEF certificate (s) with corresponding AEF 108 details (subscribed) to the API Invoker 102 at the time of service discovery or at the time of authorization or during authentication or as an independent/exclusive message exchange (request-response).

In an embodiment, during the service discovery procedure, the details about the AEF 108 are provided to the API Invoker 102 by the CCF 106, in response to the API Invoker 102 service discovery request. The details of the AEF 108 includes, the security parameters (like, Authentication method, Root certificate of the CA to verify AEF Certificate, Token, lifetime of the security credentials (Token)) and access method (CAPIF based (authentication with CCF before service request) using TLS-PSK or TLS-certificate or Access Token based or TLS-public key cryptography), Third Party Token based). In another embodiment, the API Invoker 102 may include its preference on the Authentication method, (for example, based on the foreseen frequency of the service requests) in the service discovery request. On receiving the request from the API Invoker 102, the CCF 106 decides the authentication method considering the API Invoker's 102 preference and other criteria's. The CCF 106 indicates the selected authentication method to the API Invoker 102 in response to the request. In an embodiment, the indication (selected Authentication method and reference point protection (interface security)) is included in the secure TLS connection request/protocol.

According to FIG. 5, the API Invoker 102 authenticates with the AEF 108 before invoking Northbound API/service API. In such scenario, security PSK based or the certificate based secure connection establishment methods can be used. The PSK based or the certificate based method illustrates a procedure for the API Invoker 102 to authenticate with the AEF 108 and establishes the TLS session to secure subsequent API invocations.

Figure 6:
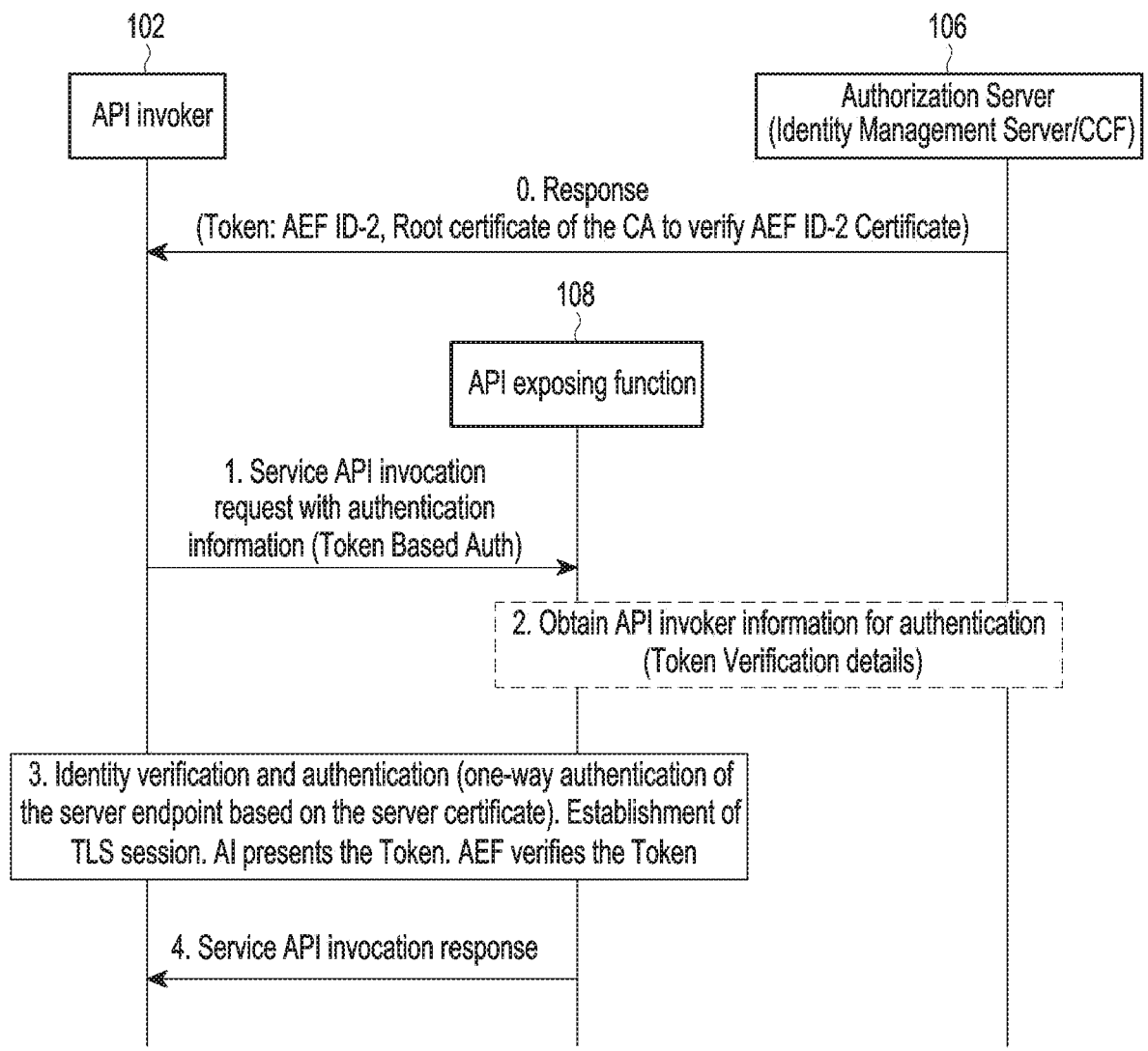
FIG. 6 illustrates a sequence diagram illustrating a Non-CCF (third-party based) authentication procedure, according to an embodiment as disclosed herein.

FIG. 6 illustrates a sequence diagram illustrating the Non-CCF (third-party based) authentication procedure, according to an embodiment as disclosed herein. The embodiments herein provides the Non-CCF (third-party based) authentication procedure to secure the interface between the API invoker 102 and the AEF 108. In this scenario, the API invoker is preconfigured or provisioned by the CCF 106 or during service discovery, obtains the information that required for a particular Service API. Further, the request needs to be made directly with the AEF 108 without (or after) contacting the CCF 106.

Figure 7:
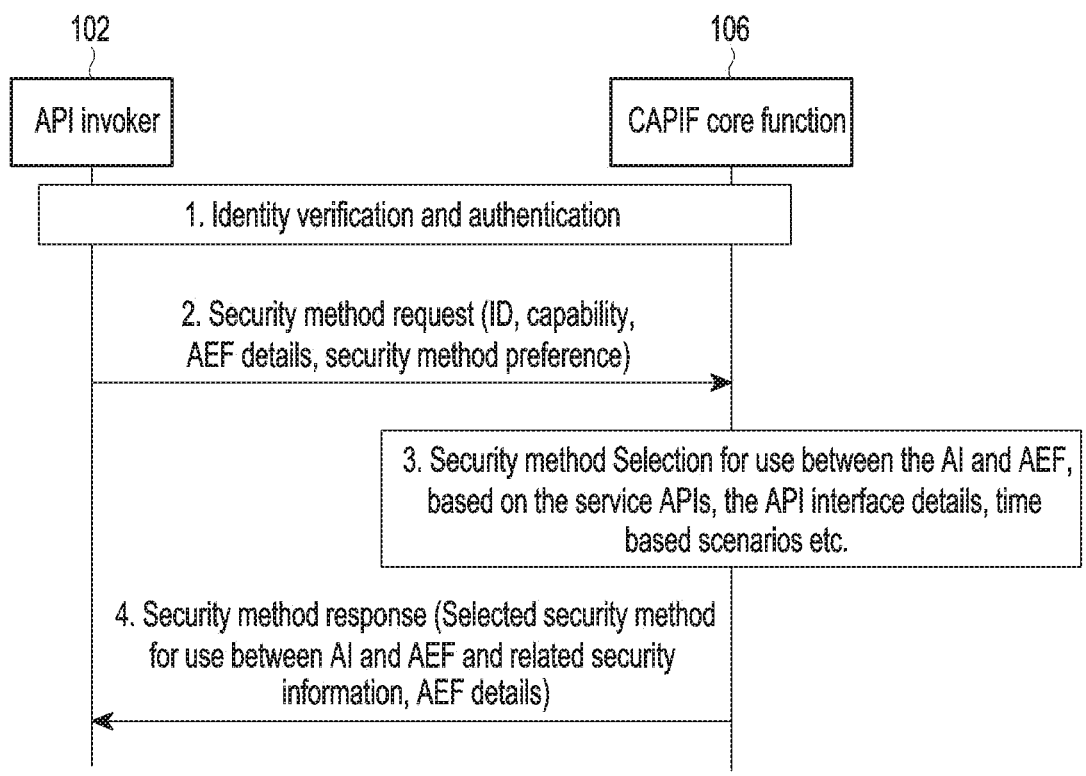
FIG. 7 illustrates a sequence diagram illustrating a scenario of determining by the CCF, the mechanisms for authentication and authorization of an API invoker by the AEF and for secure communication between them, according to an embodiment as disclosed herein.

FIG. 7 illustrates a sequence diagram illustrating a scenario of determining by the CCF, the mechanisms for authentication and authorization of an API invoker 102 by the AEF 108 and for secure communication between them, according to an embodiment as disclosed herein.

At step 1, the API invoker 102 and the CCF 106 establish a secure communication channel, for e.g. TLS using mutual authentication based on the client and the server certificates.

At step 2, the API invoker 102 sends a security method request to the CCF 106. The request to the CCF 106 includes the API invoker ID, details of the AEF 108 such as service details, interface details, northbound API details along with the preferred security method of the API invoker 102.

At step 3, the CCF 106 selects a security method to be used by the AEF 108 for authentication and authorization of the API invoker 102. The selection takes into account the information received from the API invoker 102 in step 2.

In an embodiment, the CCF 106, selects at least one of the PSK based, PKI based, OAuth 2.0, IKEv2, IPsec, Application layer security, like so based security methods for each requested interface of all the requested AEFs.

In an embodiment, the authentication method can be decided based on at least one of the following parameters: Type of service the API invoker 102 subscribed, Interface details (such as IP address/port), Protocol between the AEF 108 and the API Invoker 102, when requested for access to a particular service (when multiple services are subscribed), based on time based scenarios (subscribed APIs), based on the need on how long the TLS sessions to be alive, capability of the API Invoker, capability of the AEF 108, based on the request from the API Invoker 102 (based on User input, time of usage, number of request known in prior), a particular method is selected by the CCF 106 (per AEF or per API Invoker) and indicated to the API Invoker 102.

In an embodiment, the methods for secure communication, authentication and authorization of the API invoker 102 by the AEF 108 are associated with the service API interface details of the AEF 108 i.e. same service API hosted on two or more API interfaces of the same (or different) AEF 108, may have different security methods corresponding to each API interface, if needed by the service. The CCF 106 takes such information into consideration when determining the security method.

At step 4, the CCF 106, sends the security method response to the API invoker 102 indicating the selected security method for each AEF 108 (or each service API interface of the AEF(s)), any security information related to the selected security method (for example, Pre Shared Key for establishment of TLS and/or IPsec directly and/or IPsec via IKEv2, like so). The API invoker 102 shall use this selected security method in the subsequent communication establishment with the AEF(s) 108.

Figure 8:
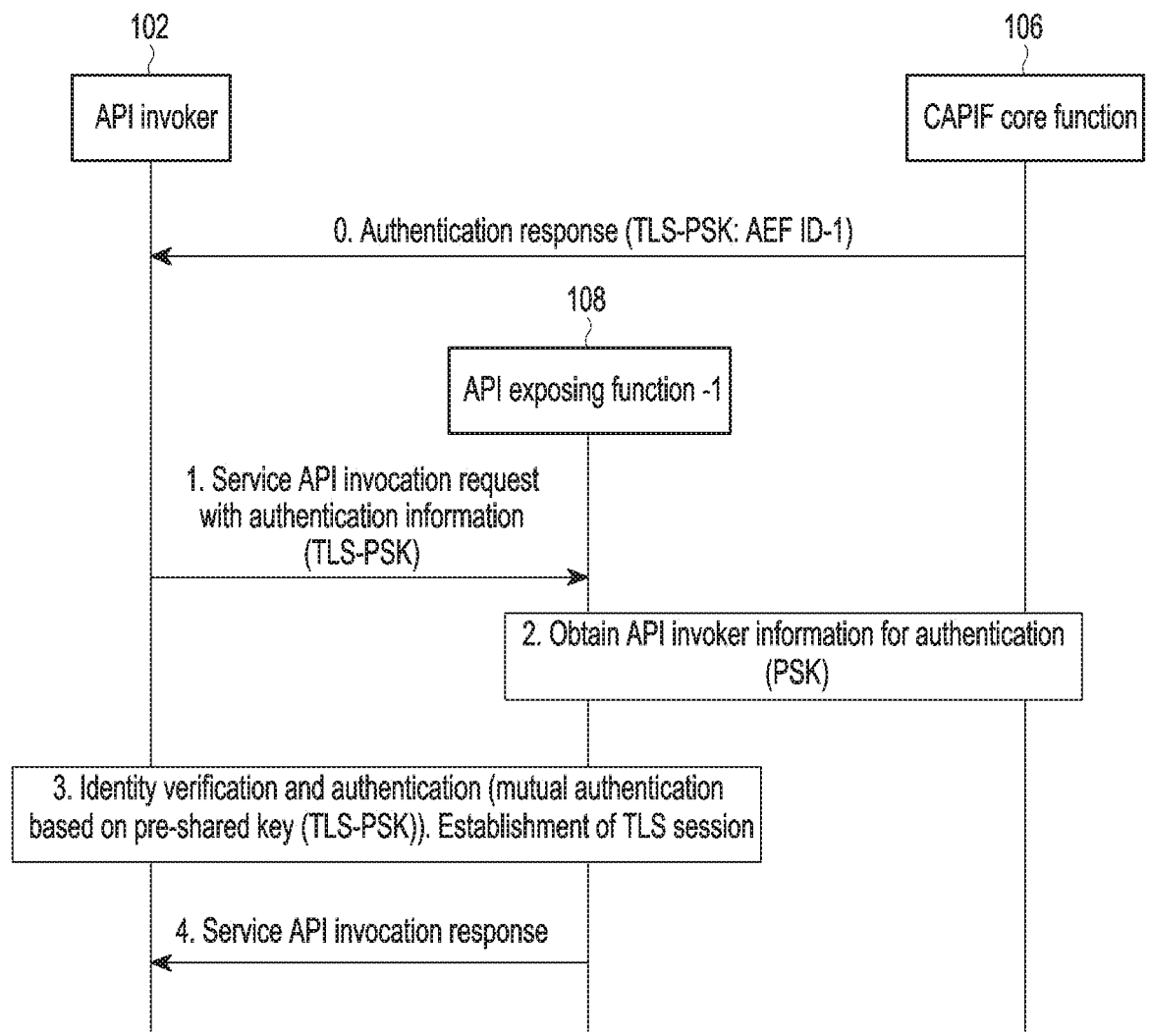
FIG. 8 illustrates a sequence diagram illustrating an API Invoker invoking Northbound APIs/service API's using a transport layer security pre-shared key (TLS-PSK) method as determined and indicated by a CCF, according to an embodiment as disclosed herein.

FIG. 8 illustrates a sequence diagram illustrating the API Invoker 102 invoking Northbound APIs/service API's using the TLS-PSK method as determined and indicated by the CCF 106, according to an embodiment as disclosed herein.

The CCF 106 can send the authentication response to the API Invoker 102. Further, the API Invoker 102 sends a Service API invocation request with authentication to the AEF 108. Further, the API Invoker 102 information is obtained for the authentication. Further, the AEF identifies verification and authentication based on the PSK. Further, the AEF gives a Service API invocation response to the API Invoker 102.

Figure 9:
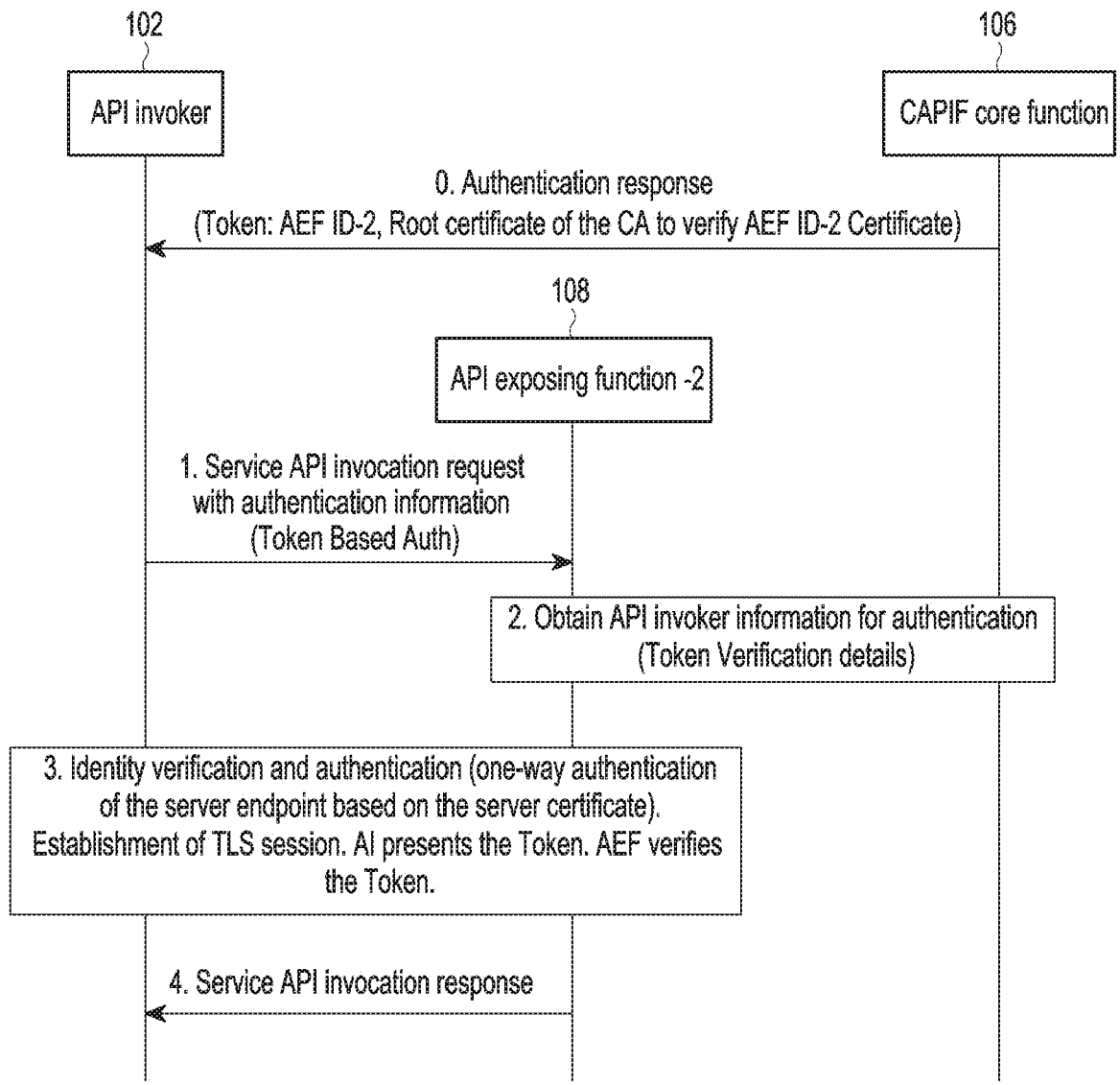
FIG. 9 illustrates a sequence diagram illustrating a API Invoker invoking Northbound APIs/service API's using access token method as determined and indicated by a CCF, according to an embodiment as disclosed herein.

FIG. 9 illustrates a sequence diagram illustrating the API Invoker 102 invoking Northbound APIs/service API's using access token method as determined and indicated by the CCF 106, according to an embodiment as disclosed herein.

According to FIG. 9, the CCF 106 shares an authentication response to the API Invoker 102 based on an authentication request from the API Invoker 102. Further, the API Invoker 102 gives a service API invocation request with the authentication information to the AEF-2 108. Further, the AEF-2 108 can be configured to receive the API Invoker 102 information for the authentication. Further, AEF-2 108 performs identity verification and authentication based on a token presented by the API invoker 102 and establishes the secure TLS connection between the API invoker 102 and the AEF 108. Further, based on the identity verification and authentication, the AEF-2 108 provides a service API invocation response.

The embodiments disclosed herein can be implemented through at least one software program running on at least one hardware device and performing network management functions to control the elements. The elements shown in FIG. 1 can be at least one of a hardware device, or a combination of hardware device and software module. For example, the embodiments disclosed herein can be implemented in a network entity managing network exposure function (NEF) in a 5G core network.

The foregoing description of the specific embodiments will so fully reveal the general nature of the embodiments herein that others can, by applying current knowledge, readily modify and/or adapt such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

What is claimed is:

1. A method performed by a first entity implementing a common application program interface framework (CAPIF) core function (CCF) in a communication system, the method comprising:
    establishing a session with a second entity implementing an authenticating application program interface (API) invoker using a transport layers security (TLS);
    receiving, from the second entity, a security method request message including information on a security method for a third entity implementing an API exposing function (AEF);
    identifying the security method for authentication between the second entity and the third entity from at least one of a TLS-pre-shared key (TLS-PSK), a TLS-public key infrastructure (TLS-PKI), or an OAuth 2.0 based on the information on the security method and an access scenario; and
    transmitting, to the second entity, the security method and security information associated with the security method,
    wherein the access scenario indicates whether the second entity accesses the third entity prior to service API invocation, and
    wherein the security method is used to provide an interface authentication and protection of the second entity.

2. The method of claim 1, wherein a capability of the second entity is further used to determine the security method.

3. A method performed by a second entity implementing an authenticating application program interface (API) invoker in a communication system, the method comprising:
    establishing a session with a first entity implementing a common application program interface framework (CAPIF) core function (CCF) using a transport layers security (TLS);
    transmitting, to the first entity, a security method request message including information on a security method for a third entity implementing an API exposing function (AEF); and
    receiving, from the first entity, the security method for authentication between the second entity and the third entity, and security information associated with the security method,
    wherein the security method is identified from at least one of a TLS-pre-shared key (TLS-PSK), a TLS-public key infrastructure (TLS-PKI), or an OAuth 2.0 based on the information on the security method and an access scenario,
    wherein the access scenario indicates whether the second entity accesses the third entity prior to service API invocation, and
    wherein the security method is used to provide an interface authentication and protection of the second entity.

4. The method of claim 3, wherein a capability of the second entity is further used to determine the security method.

5. A first entity implementing a common application program interface framework (CAPIF) core function (CCF) in a communication system, the first entity comprising:
    a transceiver; and
    at least one processor configured to:
        establish a session with a second entity implementing an authenticating application program interface (API) invoker using a transport layers security (TLS),
        receive, via the transceiver from the second entity, a security method request message including information on a security method for a third entity implementing an API exposing function,
        identify the security method for authentication between the second entity and the third entity from at least one of a TLS-pre-shared key (TLS-PSK), a TLS-public key infrastructure (TLS-PKI), or an OAuth 2.0 based on the information on the security method and an access scenario, and
        transmit, via the transceiver to the second entity, the security method and security information associated with the security method,
    wherein the access scenario indicates whether the second entity accesses the third entity prior to service API invocation, and
    wherein the security method is used to provide an interface authentication and protection of the second entity.

6. The first entity of claim 5, wherein a capability of the second entity is further used to determine the security method.

7. A second entity implementing an authenticating application program interface (API) invoker in a communication system, the second entity comprising:
    a transceiver; and
    at least one processor configured to:
        establish a session with a first entity implementing a common application program interface framework (CAPIF) core function (CCF) using a transport layers security (TLS),
        transmit, via the transceiver to the first entity, a security method request message including information on a security method for a third entity implementing an API exposing function (AEF), and
        receive, via the transceiver from the first entity, the security method for authentication between the second entity and the third entity, and security information associated with the security method,
    wherein the security method is identified from at least one of a TLS-pre-shared key (TLS-PSK), a TLS-public key infrastructure (TLS-PKI), or an OAuth 2.0 based on the information on the security method and an access scenario, wherein the access scenario indicates whether the second entity accesses the third entity prior to service API invocation, and wherein the security method is used to provide an interface authentication and protection of the second entity.

8. The second entity of claim 7, wherein a capability of the second entity is further used to determine the security method.

* * * * *